United States Patent
Myli et al.

(10) Patent No.: US 8,658,262 B2
(45) Date of Patent: Feb. 25, 2014

(54) HIGH QUALITY EMISSION CONTROL COATINGS, EMISSION CONTROL GLAZINGS, AND PRODUCTION METHODS

(75) Inventors: Kari B. Myli, Sauk City, WI (US); Gary L. Pfaff, Cazenovia, WI (US); Greg Vance, Loganville, WI (US); Klaus H. W. Hartig, Avoca, WI (US)

(73) Assignee: Cardinal CG Company, Eden Prairie, MN (US)

( * ) Notice: Subject to any disclaimer, the term of this patent is extended or adjusted under 35 U.S.C. 154(b) by 318 days.

(21) Appl. No.: 13/006,992

(22) Filed: Jan. 14, 2011

(65) Prior Publication Data

US 2012/0021149 A1    Jan. 26, 2012

Related U.S. Application Data (60) Provisional application No. 61/295,694, filed on Jan. 16, 2010.

(51) Int. Cl.
*E06B 3/66* (2006.01)
*E04C 2/54* (2006.01)

(52) U.S. Cl.
USPC ............. 428/34; 428/432; 428/433; 428/434; 428/698; 428/699; 428/701; 428/702; 52/786.1; 52/786.13

(58) Field of Classification Search
USPC ........... 428/34, 432–434, 698, 699, 701, 702; 52/786.1, 786.13
See application file for complete search history.

(56) References Cited

U.S. PATENT DOCUMENTS

| | | | |
|---|---|---|---|
| 4,144,684 A | 3/1979 | Kirkbride et al. | |
| 4,941,302 A | 7/1990 | Barry | |
| 5,011,585 A | 4/1991 | Brochot | |
| 5,135,581 A | 8/1992 | Tran | |
| 5,543,229 A | 8/1996 | Ohsaki | |
| 5,630,918 A | 5/1997 | Takahara | |
| 5,709,930 A | 1/1998 | DePauw | |
| 5,827,409 A | 10/1998 | Iwata | |
| 5,830,252 A | 11/1998 | Finley | |
| 5,873,203 A | 2/1999 | Thiel | |
| 6,045,896 A | 4/2000 | Boire | |
| 6,114,043 A | 9/2000 | Joret | |
| 6,121,178 A | 9/2000 | Eshima | |
| 6,315,874 B1 | 11/2001 | Suzuki | |
| 6,329,044 B1 | 12/2001 | Inoue | |
| 6,340,529 B1 | 1/2002 | Ebisawa | |
| 6,379,508 B1 | 4/2002 | Kobayashi | |
| 6,383,345 B1 | 5/2002 | Kim | |
| 6,416,890 B1 | 7/2002 | Terneu | |
| 6,425,990 B1 | 7/2002 | Ishibashi | |

(Continued)

FOREIGN PATENT DOCUMENTS

WO       03093185       11/2003
WO    WO-2009/036284    *  3/2009

OTHER PUBLICATIONS

International Search Report and Written Opinion for PCT/US2011/021314, mailed Apr. 10, 2012, 11 pages.

*Primary Examiner* — Donald J Loney
(74) *Attorney, Agent, or Firm* — Fredrikson & Byron, PA (57) ABSTRACT

The invention provides emission control coatings. The coating includes a transparent conductive film over which there is an oxygen barrier film. In some embodiments, the transparent conductive film comprises indium tin oxide and the oxygen barrier film comprises silicon nitride.

18 Claims, 7 Drawing Sheets

(56) References Cited

U.S. PATENT DOCUMENTS

| | | | |
|---|---|---|---|
| 6,468,403 B1 | 10/2002 | Shimizu | |
| 6,472,072 B1 | 10/2002 | Ebisawa | |
| 6,475,354 B1 | 11/2002 | Toyama | |
| 6,551,715 B1 | 4/2003 | Seto | |
| 6,562,490 B2 | 5/2003 | Ebisawa | |
| 6,610,410 B2 | 8/2003 | Ebisawa | |
| 6,617,056 B1 | 9/2003 | Hara et al. | |
| 6,632,491 B1 | 10/2003 | Thomsen | |
| 6,677,063 B2 | 1/2004 | Finley | |
| 6,699,585 B2 | 3/2004 | Ebisawa | |
| 6,743,488 B2 | 6/2004 | Memarian | |
| 6,783,861 B2 | 8/2004 | Ebisawa | |
| 6,849,165 B2 | 2/2005 | Kloppel | |
| 7,041,588 B2 | 5/2006 | Bender | |
| 7,081,302 B2 | 7/2006 | Lemmer | |
| 7,083,857 B2 | 8/2006 | Sawada | |
| 7,153,579 B2 | 12/2006 | Kriltz | |
| 7,258,757 B2 | 8/2007 | Huang | |
| 7,291,816 B2 | 11/2007 | Chen | |
| 7,294,404 B2 | 11/2007 | Krisko | |
| 7,335,421 B2 | 2/2008 | Thiel | |
| 7,339,728 B2 | 3/2008 | Hartig | |
| 7,342,716 B2 | 3/2008 | Hartig | |
| 7,527,868 B2 | 5/2009 | Grimal | |
| 7,534,496 B2 | 5/2009 | Lemmer | |
| 7,563,514 B2 | 7/2009 | Nakayama | |
| 7,566,481 B2 | 7/2009 | Veerasamy | |
| 7,572,509 B2 | 8/2009 | Hartig | |
| 7,572,510 B2 | 8/2009 | Hartig | |
| 7,572,511 B2 | 8/2009 | Hartig | |
| 7,582,356 B2 | 9/2009 | Brochot | |
| 7,597,962 B2 | 10/2009 | Butz | |
| 7,597,964 B2 | 10/2009 | Krasnov | |
| 7,604,865 B2 | 10/2009 | Krisko | |
| 7,641,818 B2 | 1/2010 | Nakayama | |
| 7,713,632 B2 | 5/2010 | Krisko | |
| 7,820,296 B2 | 10/2010 | Myli | |
| 7,820,309 B2 | 10/2010 | Myli | |
| 7,862,910 B2 | 1/2011 | Krisko | |
| 2001/0016253 A1 | 8/2001 | Goda et al. | |
| 2004/0004684 A1 | 1/2004 | Yang | |
| 2004/0137235 A1 | 7/2004 | Paul | |
| 2005/0000794 A1 | 1/2005 | Demaray | |
| 2006/0011466 A1 | 1/2006 | Chen | |
| 2006/0118408 A1 | 6/2006 | Myli | |
| 2006/0121315 A1 | 6/2006 | Myli | |
| 2006/0144695 A1 | 7/2006 | Lee | |
| 2006/0234064 A1 | 10/2006 | Baubet | |
| 2007/0029186 A1 | 2/2007 | Krasnov | |
| 2007/0081227 A1 | 4/2007 | Hartig | |
| 2007/0082124 A1 | 4/2007 | Hartig | |
| 2007/0082169 A1 | 4/2007 | Hartig | |
| 2007/0082186 A1 | 4/2007 | Hartig | |
| 2007/0137999 A1 | 6/2007 | Delrue | |
| 2007/0240977 A1 | 10/2007 | Krempel-Hesse | |
| 2008/0261035 A1 | 10/2008 | Grimal | |
| 2008/0292872 A1 | 11/2008 | Boire | |
| 2009/0020414 A1 | 1/2009 | Tsao | |
| 2009/0047509 A1 | 2/2009 | Gagliardi | |
| 2009/0075067 A1 | 3/2009 | Myli et al. | |
| 2009/0169846 A1 | 7/2009 | Siddle | |
| 2009/0214880 A1 | 8/2009 | Lemmer | |
| 2009/0297886 A1 | 12/2009 | Gessert | |
| 2009/0320824 A1 | 12/2009 | Henn | |

* cited by examiner

HIGH QUALITY EMISSION CONTROL COATINGS, EMISSION CONTROL GLAZINGS, AND PRODUCTION METHODS

CROSS-REFERENCE TO RELATED APPLICATION

This patent application claims priority to provisional U.S. Patent Application No. 61/295,694, filed on Jan. 16, 2010, the entire contents of which are hereby incorporated by reference herein.

FIELD OF THE INVENTION

The present invention relates to thin film coatings for glass and other substrates. In particular, this invention relates to emission control coatings that are used on external surfaces of glazing assemblies. Also provided are methods and equipment for producing such coatings and glazing assemblies.

BACKGROUND OF THE INVENTION

Pyrolytic transparent conductive oxide (TCO) coatings are well known in the art. Commonly, these coatings include a fluorinated tin oxide layer. These coatings are applied "on-line" by supplying precursor gas and/or other precursor materials while a ribbon of glass is still hot on a float glass production line. The coating formed on the glass tends to be quite durable and very hard, which is advantageous. The haze of such coatings, however, tends to be relatively high. For example, one commercially available pyrolytic TCO coating, which is believed to be fairly typical of such coatings, has a haze of about 0.74-0.96. Furthermore, pyrolytic coatings tend to be relatively rough. For example, the noted commercially available pyrolytic coating has a roughness $R_a$ of about 24.9 nm. Moreover, it would be desirable to avoid pyrolytic processes involving fluorine.

SUMMARY OF THE INVENTION

Certain embodiments of the invention provide a first pane having opposed first and second major surfaces. In the present embodiments, the first pane is part of a multiple-pane insulating glazing unit that includes a second pane. The insulating glazing unit has at least one between-pane space. The second pane has an external surface bearing an emission control coating comprising a transparent conductive film over which there is provided an oxygen barrier film. Preferably, the emission control coating has both a haze of less than 0.3 and a roughness $R_a$ of less than 3 nm, in combination with the coated pane having a monolithic visible transmission of greater than 75%.

In some embodiments, the invention provides a heat treated coated glass pane having a major surface on which there is an emission control coating comprising a transparent conductive film comprising indium tin oxide over which there is an oxygen barrier film comprising silicon nitride. In the present embodiments, the transparent conductive film comprising indium tin oxide has a thickness of between about 500 angstroms and about 3,000 angstroms, the oxygen barrier film comprising silicon nitride has a thickness of between about 200 angstroms and about 900 angstroms, the emission control coating has both a haze of less than 0.3 and a roughness $R_a$ of less than 3 nm, and the coated pane has a monolithic visible transmission of greater than 80%.

Some embodiments provide a multiple-pane insulating glazing unit including an outboard pane and an inboard pane, and the insulating glazing unit has at least one between-pane space. In the present embodiments, the insulating glazing unit has an internal surface bearing a low-emissivity coating that includes at least one film comprising silver and that is exposed to the between-pane space. The inboard pane in the present embodiments has a room-side external surface bearing an emission control coating comprising a transparent conductive film over which there is provided an oxygen barrier film comprising a nitride material. Preferably, the emission control coating has both a haze of less than 0.3 and a roughness $R_a$ of less than 3 nm.

In certain embodiments, the invention provides a first pane having opposed first and second major surfaces, the first pane being part of a multiple-pane insulating glazing unit that includes a second pane, wherein the insulating glazing unit has at least one between-pane space, wherein the second pane has an external surface bearing an emission control coating comprising a sputtered transparent conductive film over which there is provided a sputtered oxygen barrier film comprising a nitride or an oxynitride, the emission control coating having both a haze of less than 0.5 and a roughness $R_a$ of less than about 10 nm, the coated pane having a monolithic visible transmission of greater than 75%. In some of these embodiments, the transparent conductive film includes tin (and may comprise indium tin oxide), the oxygen barrier film includes silicon (and may comprise silicon nitride or silicon oxynitride), the emission control coating has a sheet resistance of less than 13 Ω/square, the haze is less than 0.1, the roughness $R_a$ is less than about 2 nm, and the monolithic visible transmission is greater than 81%.

DETAILED DESCRIPTION OF PREFERRED EMBODIMENTS

The following detailed description is to be read with reference to the drawings, in which like elements in different drawings have like reference numerals. The drawings, which are not necessarily to scale, depict selected embodiments and are not intended to limit the scope of the invention. Skilled artisans will recognize that the examples provided herein have many useful alternatives that fall within the scope of the invention.

Many embodiments of the invention involve a coated substrate. A wide variety of substrate types are suitable for use in the invention. In some embodiments, the substrate is a sheet-like substrate having generally opposed first and second major surfaces. For example, the substrate can be a sheet of transparent material (i.e., a transparent sheet). The substrate, however, is not required to be a sheet, nor is it required to be transparent.

For many applications, the substrate will comprise a transparent (or at least translucent) material, such as glass or clear plastic. For example, the substrate is a glass sheet (e.g., a window pane) in certain embodiments. A variety of known glass types can be used, such as soda-lime glass. In some cases, it may be desirable to use "white glass," a low iron glass, etc. In certain embodiments, the substrate is part of a window, door, skylight, or other glazing. To accomplish solar control, the present coating can be applied on tinted solar glass. Thus, the coating of any embodiment disclosed herein can optionally be provided on a sheet of tinted glass. This can provide good selectivity.

Substrates of various sizes can be used in the present invention. Commonly, large-area substrates are used. Certain embodiments involve a substrate having a major dimension (e.g., a length or width) of at least about 0.5 meter, preferably at least about 1 meter, perhaps more preferably at least about 1.5 meters (e.g., between about 2 meters and about 4 meters), and in some cases at least about 3 meters. In some embodiments, the substrate is a jumbo glass sheet having a length and/or width that is between about 3 meters and about 10 meters, e.g., a glass sheet having a width of about 3.5 meters and a length of about 6.5 meters. Substrates having a length and/or width of greater than about 10 meters are also anticipated.

Substrates of various thicknesses can be used in the present invention. In some embodiments, the substrate (which can optionally be a glass sheet) has a thickness of about 1-8 mm. Certain embodiments involve a substrate with a thickness of between about 2.3 mm and about 4.8 mm, and perhaps more preferably between about 2.5 mm and about 4.8 mm. In one particular embodiment, a sheet of glass (e.g., soda-lime glass) with a thickness of about 3 mm is used.

Figure 1:
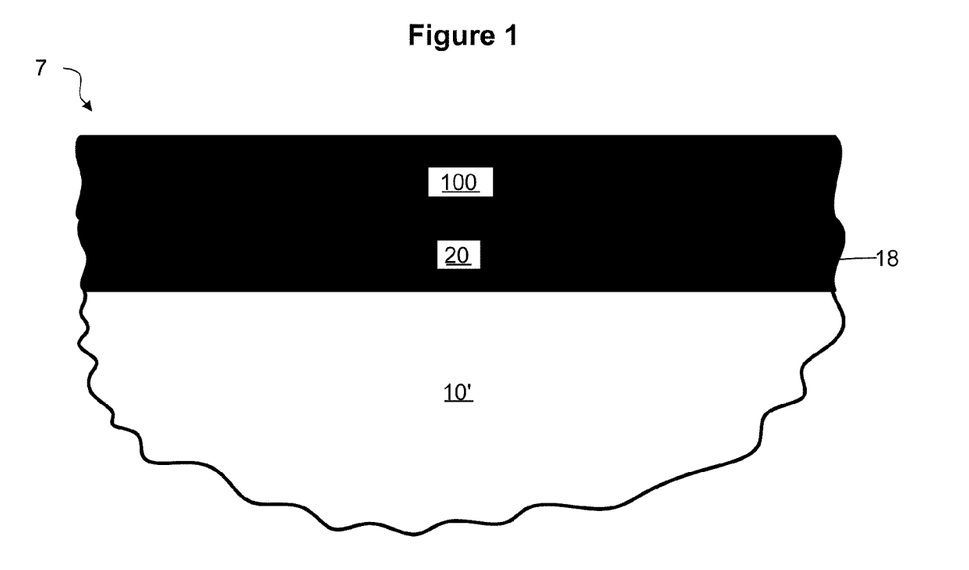
FIG. 1 is a schematic cross-sectional view of a substrate having a major surface carrying an emission control coating in accordance with certain embodiments.
Figure 2:
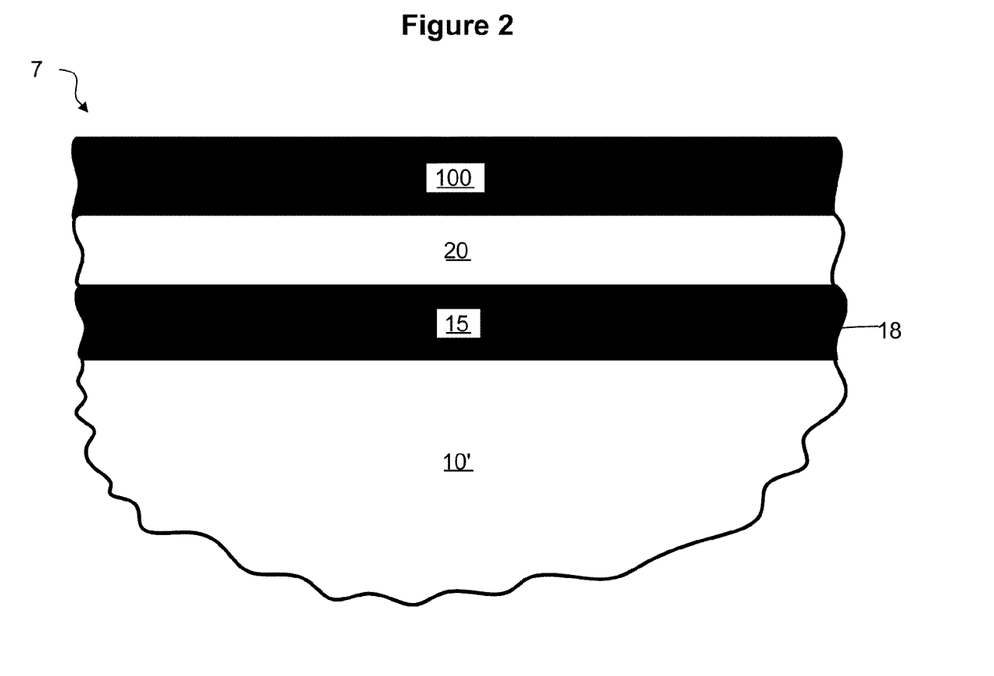
FIG. 2 is a schematic cross-sectional view of a substrate having a major surface carrying an emission control coating in accordance with certain embodiments.

Preferably, the substrate 10' has opposed major surfaces 16 and 18. In many cases, surface 16 is destined to be an internal surface facing a between-pane space in an insulating glazing unit while surface 18 is destined to be an external surface facing an interior of a building. As shown in FIGS. 1 and 2, the substrate 10' bears an emission control coating 7. In FIG. 1, the coating 7 includes, in sequence from surface 18 outwardly, a transparent conductive film 20 and an oxygen barrier film 100. In FIG. 2, the coating 7 includes, from surface 18 outwardly, a base film 15, a transparent conductive film 20, and an oxygen barrier film 100. The films 15, 20, and 100 can be in the form of discrete layers, thicknesses of graded film, or a combination of both including at least one discrete layer and at least one thickness of graded film. While the base film 15 is shown as a single layer, it can alternatively be a plurality of layers. In some embodiments, all the films in the coating 7 are sputtered films.

Preferably, the coating 7 is formed of materials, and made by a process (as detailed herein), that allows the coated substrate to have a haze level of less than 0.5 or less than 0.3 (e.g., less than 0.2, less than 0.1, or even less than 0.09), a roughness $R_a$ of less than about 10 nm, less than about 5 nm, or less than about 3 nm (e.g., less than about 2 nm), and a monolithic visible transmission of greater than 75% (perhaps greater than 80%).

Haze can be measured in well known fashion, e.g., using a BYK Haze-Gard plus instrument. Reference is made to ASTM D 1003-00: Standard Test method for Haze and Luminous Transmittance of Transparent Plastics, the contents of which are incorporated herein by reference.

Described below are samples that have a haze of about 0.08 and a surface roughness of about 1.9 nm, together with a monolithic visible transmission of greater than 70% (e.g., before and after heat treatment), greater than 73% (e.g., before and after heat treatment), greater than 81% (e.g., after heat treatment), greater than 82% (e.g., after heat treatment), or even greater than 85% in some cases (e.g., after heat treatment), in combination with a post-heat $R_{sheet}$ of less than 25 ohms/square, less than 20 ohms/square, less than 17 ohms/square, less than 15 ohms/square, or even less than 13 ohms/square in some cases.

When provided, the optional base film 15 can comprise, consist essentially of, or consist of silica, alumina, or a mixture of both. In some cases, silicon oxynitride (optionally containing some aluminum) may be used. Silicon nitride (optionally containing some aluminum) may also be used. Combinations of these materials may be used as well. Other films known to be useful as sodium ion diffusion barriers may also be used. In preferred embodiments, the transparent conductive film 20 comprises, consists essentially of, or consists of indium tin oxide. In alternate embodiments, zinc aluminum oxide, SnO:Sb, sputtered SnO:F, or another known TCO is used. Thus, in certain embodiments, the TCO is a sputtered film that includes tin (e.g., comprising tin oxide together with antimony, fluorine, or another dopant). In some cases, the TCO film includes carbon nanotubes. Also, in preferred embodiments, the oxygen barrier film comprises, consists essentially of, or consists of a nitride, such as silicon nitride, aluminum nitride, or a mixture of both. If desired, oxynitride films (e.g., silicon oxynitride, optionally including some aluminum) may also be used. In preferred embodiments, the emission control coating 7 includes a base film 15 comprising (or consisting essentially of) silica, a transparent conductive film 20 comprising (or consisting essentially of) indium tin oxide, and a oxygen barrier film 100 comprising (or consisting essentially of) silicon nitride. The silica and silicon nitride can include aluminum.

The optional base film 15 preferably has a thickness of about 50 angstroms or more, such as about 70-300 angstroms. In certain embodiments, the coating includes a silica base film (optionally including some aluminum), an alumina base film, a silicon nitride base film (optionally including some aluminum), or a silicon oxynitride base film (optionally including some aluminum), in some cases at a thickness of about 75 angstroms, or about 150 angstroms.

In other embodiments, though, the transparent conductive film 20 is directly on (i.e., in direct contact with) the substrate surface 18. In these embodiments, there is of course no base film 15. Reference is made to FIG. 1. Applicant has found that surprisingly good properties can be achieved in embodiments wherein the transparent conductive film 20 is directly on the substrate surface 18.

The transparent conductive film 20 can have a thickness of between about 500 Å and 3,000 Å. In certain embodiments, the film 20 has a thickness of less than 1,500 Å, such as between about 1,000 Å and about 1,500 Å, e.g., about 1,050-1,400 Å.

The oxygen barrier film 100 can have a thickness of between about 200 Å and about 900 Å. In certain embodiments, the film 100 has a thickness of between about 300 Å and about 800 Å, such as about 560 Å, or about 460 Å.

Particularly good results have been found where the thickness of the transparent conductive film 20 is about 1,050-1,400 Å and the thickness of the oxygen barrier film 100 is about 400-750 Å. However, this combination of thicknesses is not required in all embodiments. Rather, this combination of thicknesses is merely used in one group of embodiments. This combination of thicknesses, however, can optionally be provided in any embodiment hereof (i.e., in any embodiment having other combinations of features described herein).

In certain embodiments, the emission control coating 7 includes (or consists essentially of) a transparent conductive film 20 comprising indium tin oxide (or another tin-containing film) having a thickness of between about 500 Å and about 3,000 Å, and an oxygen barrier film 100 comprising silicon nitride (or silicon oxynitride) having a thickness of between about 200 Å and about 900 Å. For example, the transparent conductive film 20 can optionally comprise indium tin oxide at a thickness of between about 1,100 Å and about 1,500 Å, and the oxygen barrier film 100 can optionally comprise (or consist essentially of) silicon nitride at a thickness of between about 400 Å and about 750 Å. The silicon nitride or silicon oxynitride can include aluminum.

Table 1 below shows four exemplary film stacks that can be used advantageously as the emission control coating 7:

TABLE 1

| FILM | SAMPLE A | SAMPLE B | SAMPLE C | SAMPLE D |
| --- | --- | --- | --- | --- |
| ITO | 1,100 Å | 1,250 Å | 1,240 Å | 1,350 Å |
| $Si_3N_4$ | 560 Å | 560 Å | 600 Å | 460 Å |

Figure 3:
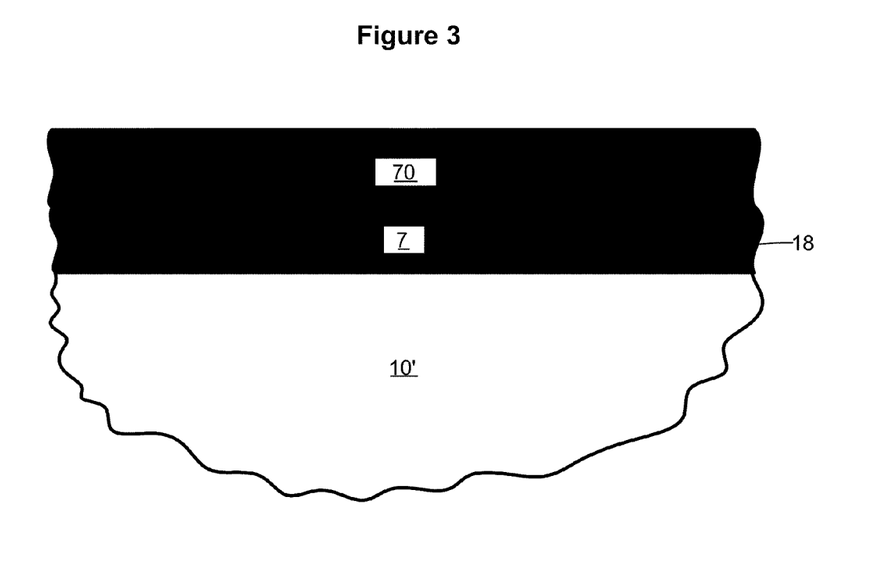
FIG. 3 is a schematic cross-sectional view of a substrate having a major surface carrying a hydrophilic and/or photocatalytic coating over an emission control coating in accordance with certain embodiments.

In some cases, as shown in FIG. 3, a photocatalytic and/or hydrophilic coating 70 is provided over the emission control coating 7. Suitable coatings are described in U.S. Patent and Application Nos. U.S. Pat. No. 7,294,404 and Ser. No. 11/129,820 and U.S. Pat. Nos. 7,713,632 and 7,604,865 and Ser. No. 11/293,032 and U.S. Pat. Nos. 7,862,910 and 7,820,309 and 7,820,296, the salient teachings of each of which are incorporated herein by reference.

In certain embodiments, the emission control coating 7 is on a #4 surface, a #6 surface, or another external surface of the inboard pane of an IG unit. By providing the emission control coating on this surface, the temperature of this indoor pane in certain cases will be decreased. In such cases, by providing a photocatalytic and/or hydrophilic coating 70 over the emission control coating 7, any condensation that may occur on the room-side surface may be more readily formed into a sheet and evaporated. Any embodiment hereof can optionally be provided with a photocatalytic and/or hydrophilic coating 70 over the emission control coating 7.

Thus, certain embodiments provide a coated substrate (e.g., a glass pane) having the following films in sequence moving outwardly from the substrate (though, not necessarily in contiguous sequence): electrically conductive sputtered film comprising tin oxide/sputtered film comprising silicon nitride (or another nitride, or an oxynitride)/sputtered film comprising titania. Here, the film comprising titania can be, for example, a $TiO_2$ film or a film comprising both titanium oxide and tungsten oxide. When provided, the film comprising titania can have a physical thickness of less than 100 Å, less than 75 Å, or even less than 50 Å. In one embodiment, 25-40 Å of $TiO_2$ is used. In another embodiment, a TiO:WO film is used (optionally having about 2.5% W) at a thickness of 50-80 Å, such as about 70 Å. In the present embodiments, the film comprising titania can be directly over the emission control coating 7 (e.g., such that there is direct contact between the film comprising titania and the oxygen barrier film), and/or the film comprising titania can be the outermost (i.e., exposed) film.

The "first" (or "#1") surface is exposed to an outdoor environment. Accordingly, it is the #1 surface that radiation from the sun first strikes. The external surface of the outboard pane is the so-called first surface. Moving from the #1 surface toward the interior of the building, the next surface is the "second" (or "#2") surface. Thus, the internal surface of the outboard pane is the so-called second surface. Moving further toward the interior of the building, the next surface is the "third" (or "#3") surface, followed by the "fourth" (or "#4") surface. This convention is carried forward for IG units having more than four major pane surfaces.

For example, one particular group of embodiments provides a triple glazing (i.e., an insulating glazing unit having three panes) and the present coating is provided on the #6 surface of the glazing. Here again, the #1 and/or #2 surfaces can have the optional coatings described herein.

In certain embodiments, the substrate 10' is heated prior to film deposition, during deposition, or both. Additionally or alternatively, the coated substrate 10' can be heat treated after being coated. If desired, the post-deposition heat treatment can be performed in air due to the presence of the oxygen barrier film 100. When the coated substrate 10' is heat treated, defects in the film can be healed and improvement of crystalline structure can occur in the transparent conductive film 20 without an uncontrollable change in the chemistry of the transparent conductive film 20. It has been found that the preferred oxygen barrier film 100 taught herein can prevent oxygen from reaching the transparent conductive film 20 and causing an uncontrollable change in its chemistry during heat treatment. The preferred film materials and thicknesses described above are particularly advantageous in this regard.

In certain embodiments, the coating 7 is on a glass pane, and this coated glass pane is heat treated through a process selected such that the coated glass can be cut readily by conventional glass cutting techniques even after the heat treatment. This, for example, can involve using lower temperature for conversion so as to maintain the stress in the glass such that it remains cut-able even after the heat treatment.

With reference to FIGS. 4-7, the substrate 10' can optionally be a transparent pane that is part of an insulating glazing unit 110. Commonly, the insulating glazing unit 110 has an exterior pane 10 and an interior pane 10' separated by at least one between-pane space 800. A spacer 900 (which can optionally be part of a sash) is commonly provided to separate the panes 10 and 10'. The spacer 900 can be secured to the internal surfaces of each pane using an adhesive or seal 700. In some cases, an end sealant 600 is also provided. In the illustrated embodiment, the exterior pane 10 has an external surface 12 (the #1 surface) and an internal surface 14 (the #2 surface). The interior pane 10' has an internal surface 16 (the #3 surface) and, in some cases, an external surface 18 (the #4 surface). In some embodiments, the insulating glazing unit includes at least three panes. The unit can optionally be mounted in a frame (e.g., a window frame) such that the external surface 12 of the exterior pane 10 is exposed to an outdoor environment 77 while the external surface 18 of the interior pane 10' is exposed to a room-side interior environment. Each internal surface of the unit is exposed to a between-pane space 800 of the unit. In some embodiments, the unit is a vacuum IG unit.

Figure 4:
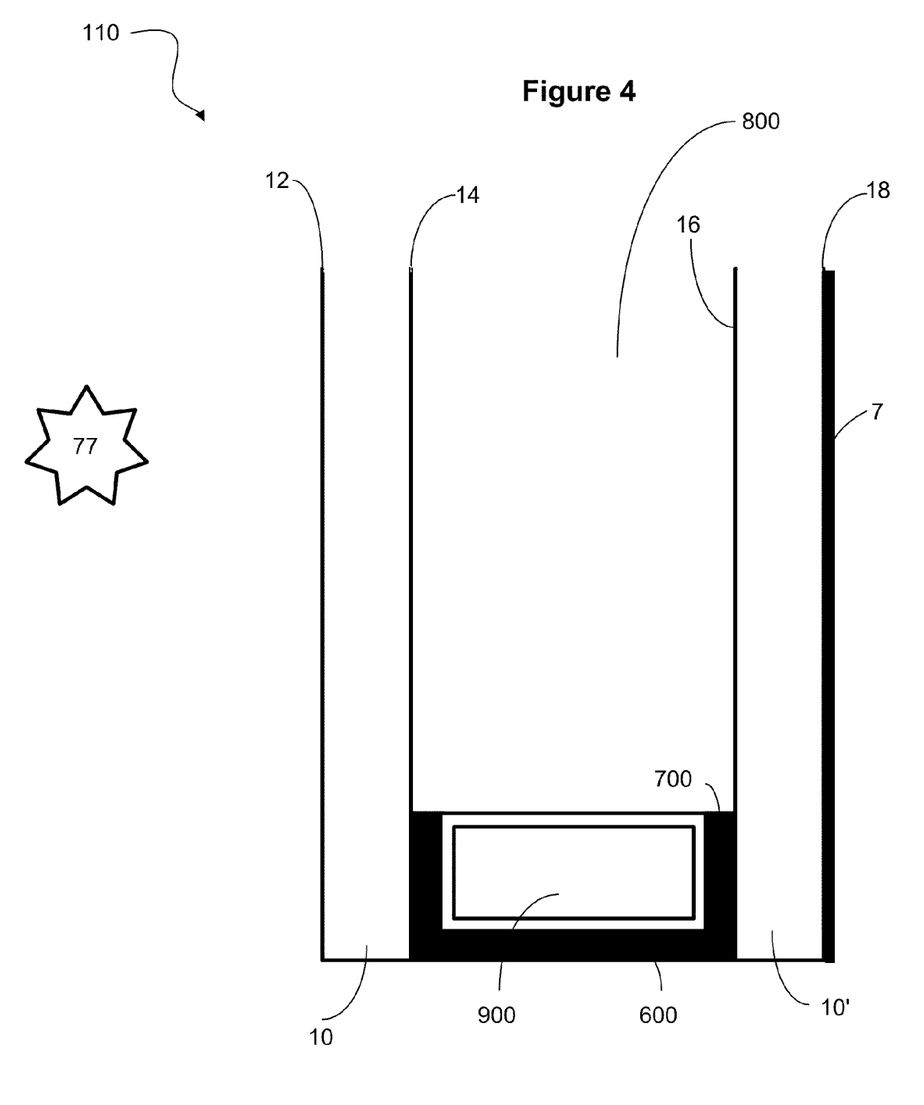
FIG. 4 is a partially broken-away schematic cross-sectional side view of a multiple-pane insulating glazing unit that includes an exterior pane and an interior pane, the interior pane having a fourth surface carrying an emission control coating in accordance with certain embodiments.

The IG unit 110 includes an emission control coating 7 in accordance with any embodiment described in this disclosure. In the embodiment of FIG. 4, the external surface 18 of pane 10' bears the emission control coating 7. Here, the emission control coating 7 is exposed to an environment (e.g., a temperature-controlled living space) inside a home or another building.

Figure 5:
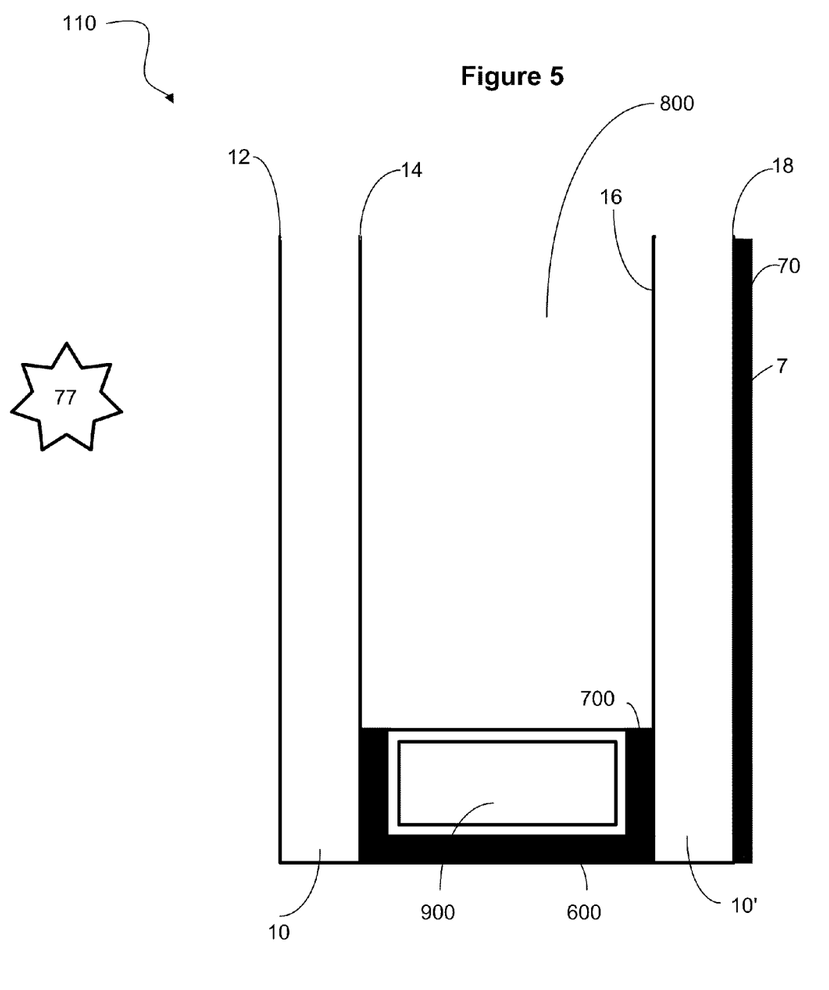
FIG. 5 is a partially broken-away schematic cross-sectional side view of a multiple-pane insulating glazing unit that includes an exterior pane and an interior pane, the interior pane having a fourth surface carrying a hydrophilic and/or photocatalytic coating over an emission control coating in accordance with certain embodiments.
Figure 6:
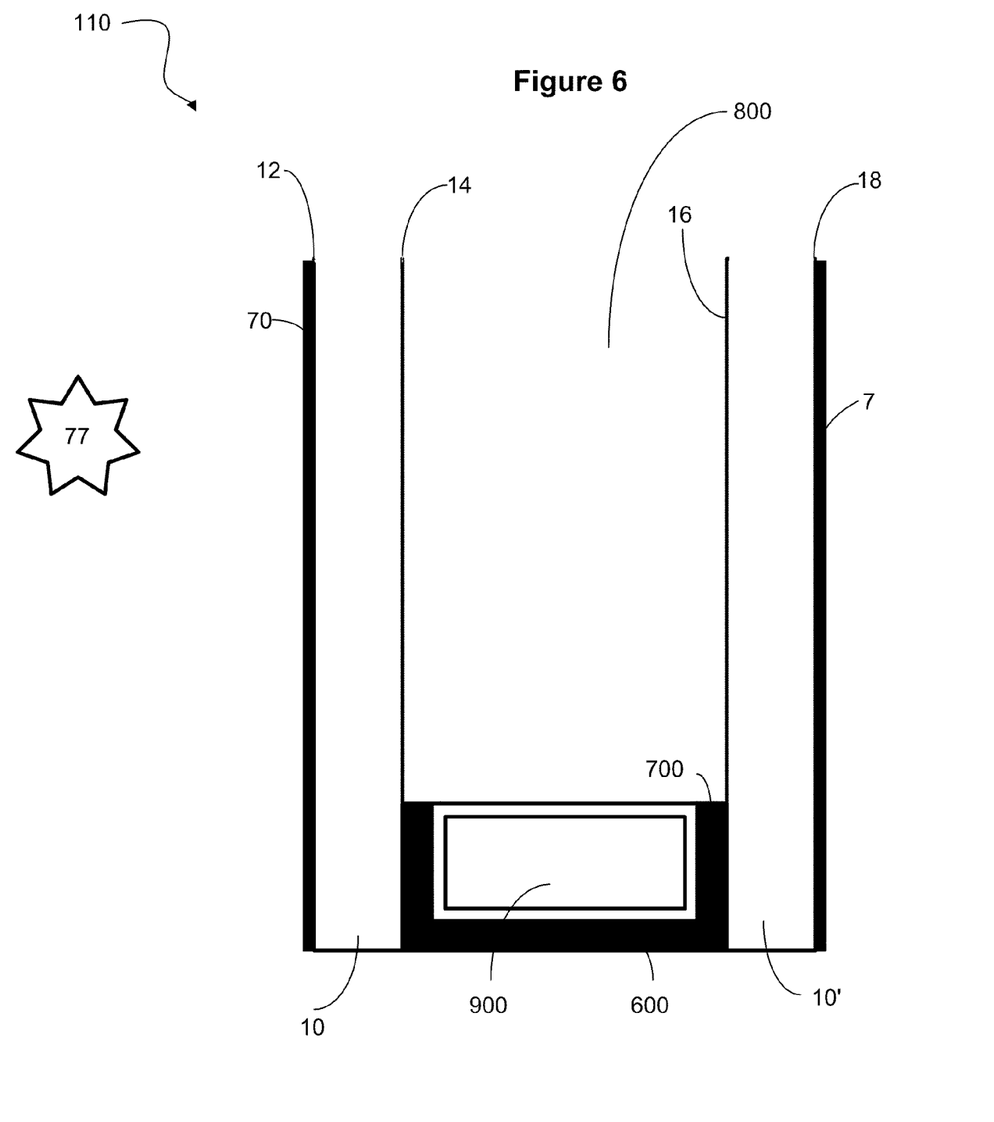
FIG. 6 is a partially broken-away schematic cross-sectional side view of a multiple-pane insulating glazing unit that includes an exterior pane and an interior pane, the exterior pane having a first surface carrying a hydrophilic and/or photocatalytic coating and the interior pane having a fourth surface carrying an emission control coating in accordance with certain embodiments.

The IG unit 110 can further include one or more hydrophilic and/or photocatalytic coatings 70. In the embodiment of FIG. 5 (discussed above with respect to FIG. 3), the IG unit includes a hydrophilic and/or photocatalytic coating 70 over the emission control coating 7 on surface 18, such that coating 70 is exposed to an environment (e.g., a temperature-controlled living space) inside a home or another building. In the embodiment of FIG. 6, a hydrophilic and/or photocatalytic coating 70 is provided on the external surface 12 of pane 10, so that coating 70 is exposed to an outdoor environment 77 (so as to be in periodic contact with rain). In other embodiments, on surface 12 there is another emission control coating under the coating 70 to reduce condensation on the #1 surface. If desired, the IG unit can include two hydrophilic and/or photocatalytic coatings, e.g., one such coating 70 on the external surface 12 of pane 10 and another such coating 70 over the emission control coating 7 on the external surface 18 of pane 10'.

In some embodiments, there are two hydrophilic and/or photocatalytic coatings on the IG unit, e.g., such coatings can be on the external surface of the outboard pane and on the external surface of the inboard pane. In some embodiments of this nature, these two coatings are different. For example, the coating on the external surface of the outboard pane can optionally be a photocatalytic coating while the coating on the external surface of the inboard pane can optionally be a non-photocatalytic hydrophilic coating, such as silica. In other embodiments, the external surface of the outboard pane and the external surface of the inboard pane both have photocatalytic coatings, but they are different (e.g., in terms of thickness or composition). For example, the photocatalytic coating on the external surface of the inboard pane can be adapted for activation by indoor light, while the photocatalytic coating on the external surface of the outboard pane may require direct sunlight for activation. Thus, the indoor photocatalytic coating may have a higher level of photoactivity (e.g., it may be thicker or have a more highly photoactive composition) than the outside photocatalytic coating.

Figure 7:
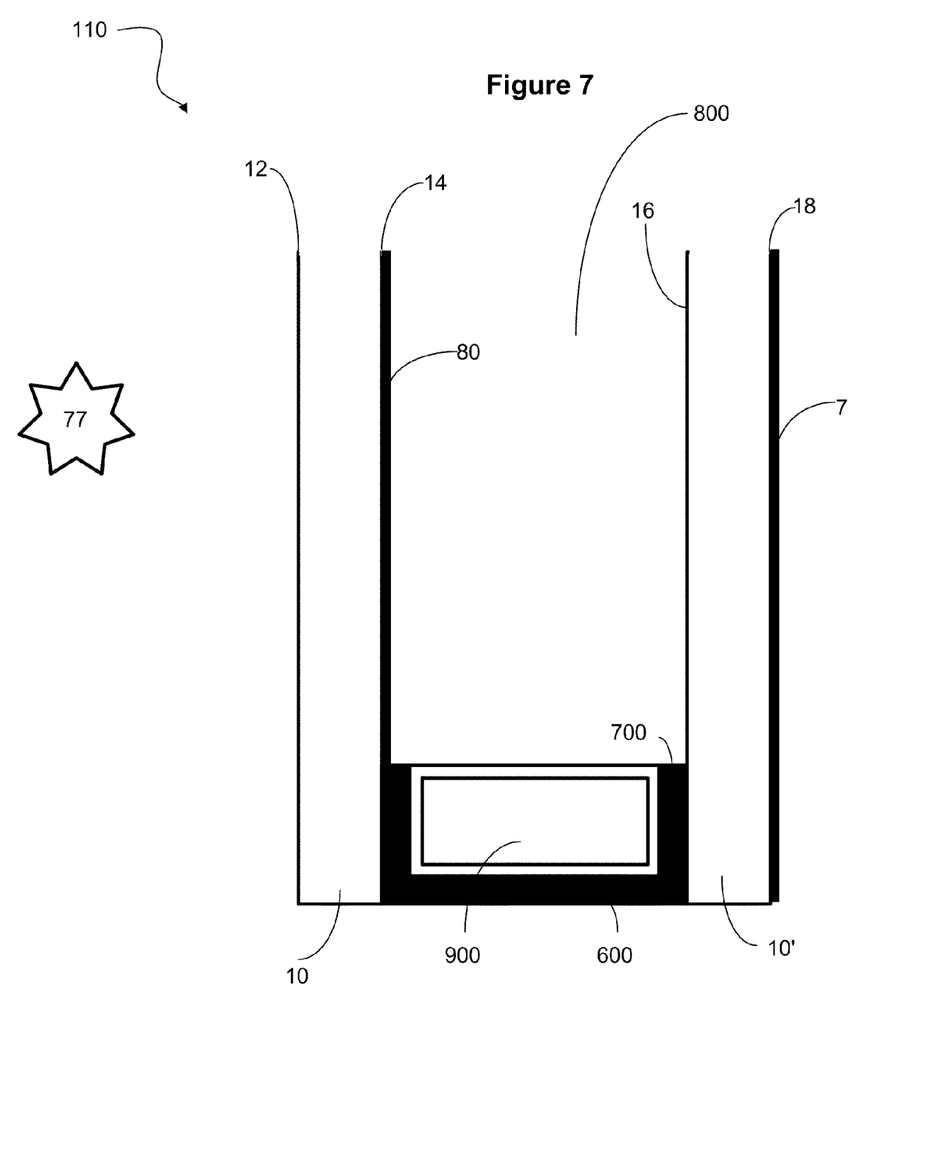
FIG. 7 is a partially broken-away schematic cross-sectional side view of a multiple-pane insulating glazing unit that includes an exterior pane and an interior pane, the exterior pane having a second surface carrying a low-emissivity coating and the interior pane having a fourth surface carrying an emission control coating in accordance with certain embodiments.

The IG unit 110 can include one or more low-emissivity coatings 80. In the embodiment of FIG. 7, the IG unit includes a low-emissivity coating 80 on the internal surface 14 of pane 10. If desired, a low-emissivity coating 80 can alternatively be on the internal surface 16 of pane 10'. In some embodiments, the coating 80 includes three or more infrared-reflective layers (e.g., silver-containing layers). Low-emissivity coatings with three or more infrared-reflective layers are described in U.S. Patent and Application Nos. 11/546,152 and U.S. Pat. Nos. 7,572,511 and 7,572,510 and 7,572,509 and Ser. No. 11/545,211 and U.S. Pat. Nos. 7,342,716 and 7,339,728, the salient teachings of each of which are incorporated herein by reference. In other cases, the low-emissivity coating can be a "single silver" or "double silver" low-emissivity coating, which are well-known to skilled artisans.

Thus, the present coating 7 can be applied on one or more of the following IG unit surfaces: the #1 surface, the #4 surface (for double glazings), and the #6 surface (for triple glazings). When applied on the #1 surface, the pane will stay warmer and have less condensation. When applied on a #4 or #6 surface, the inboard pane will stay cooler and save energy, but it may catch condensation. In such cases, a hydrophilic and/or photocatalytic coating may be provided over coating 7 so as to encourage rapid evaporation of any condensation that may occur. The present coating 7 can even be beneficial for monolithic glazings or laminated glass.

The present emission control coating 7 has a number of beneficial properties. The ensuing discussion reports several of these properties. In some cases, properties are reported herein for a single (i.e., monolithic) pane 10' bearing the present coating 7 on one surface 18 ("the present pane"). In other cases, these properties are reported for a double-pane IG unit 110 having the emission control coating 7 on the #4 surface 18 and a triple silver low-emissivity coating on the #2 surface. The triple silver low-emissivity coating is known commercially as the 366 product from Cardinal CG Company. In such cases, the reported properties are for an IG unit wherein both panes are clear 2.2 mm soda lime float glass with a ½ inch between-pane space filled with an insulative gas mix of 90% argon and 10% air ("the present IG unit"). Of course, these specifics are by no means limiting to the invention. Absent an express statement to the contrary, the present discussion reports determinations made using the well known WINDOW 5.2a computer program (e.g., calculating center of glass data) under standard ASHRAE conditions.

As already explained, the emission control coating 7 comprises a transparent conductive film, e.g., a transparent conductive oxide, such as indium tin oxide. This film is electrically conductive and imparts low sheet resistance in the coating. For example, the sheet resistance of the present coating 7 will be less than 25 Ω/square or less than 20 Ω/square. Preferably, the sheet resistance of this coating 7 is less than 18 Ω/square (e.g., less than 15 Ω/square, less than 14 Ω/square, or even less than 13 Ω/square). The sheet resistance of the coating can be measured in standard fashion using a 4-point probe. Other methods known in the art as being useful for calculating sheet resistance can also be used.

The coating 7 also has low emissivity. For example, the emissivity of the coating 7 will be less than 0.5 or is less than 0.3. Preferably, the emissivity of this coating 7 is less than 0.25, less than 0.22, less than 0.2, or even less than 0.18, such as about 0.15. In contrast, an uncoated pane of clear glass would typically have an emissivity of about 0.84.

The term "emissivity" is well known in the present art. This term is used herein in accordance with its well-known meaning to refer to the ratio of radiation emitted by a surface to the radiation emitted by a blackbody at the same temperature. Emissivity is a characteristic of both absorption and reflectance. It is usually represented by the formula: $E=1-Reflectance$. The present emissivity values can be determined as specified in "Standard Test Method For Emittance Of Specular Surfaces Using Spectrometric Measurements" NFRC 301-93, the entire teachings of which are incorporated herein by reference.

In addition to low sheet resistance and low emissivity, the U Value of the present IG unit is very low. As is well known, the U Value of an IG unit is a measure of the thermal insulating property of the unit. The smaller the U value the better the insulating property of the unit. The U Value of the present IG unit is less than 0.35 (i.e., center of glass U value), less than 0.3, less than 0.25, less than 0.22, e.g., about 0.2.

The term U Value is well known in the art. It is used herein in accordance with its well-known meaning to express the amount of heat that passes through one unit of area in one unit of time for each unit of temperature difference between a hot side of the IG unit and a cold side of the IG unit. The U Value can be determined in accordance with the standard specified for $U_{winter}$ in NFRC 100-91 (1991), the entire teachings of which are incorporated herein by reference.

A tradeoff is sometimes made in low U value coatings whereby the film(s) selected to achieve a low U value have the effect of decreasing the visible transmittance to a lower level than is desired and/or increasing the visible reflectance to a higher level than is ideal. As a consequence, windows bearing these coatings may have unacceptably low visible transmission, a somewhat mirror-like appearance, and/or suboptimal color properties.

In combination with the beneficial properties discussed above, the present coating 7 has good optical properties. As noted above, a tradeoff is sometimes made in low U value coatings whereby the films selected to achieve a low U value have the effect of restricting the visible transmission to a level that is lower than ideal.

To the contrary, the present coating 7 provides a good combination of these properties. For example, the present IG unit 110 (and the present pane 10', whether monolithic or as part of the IG unit 110) has a visible transmittance $T_v$ of greater than 0.4 (i.e., greater than 40%). Preferably, the present IG unit 110 (and the present pane 10', whether monolithic or insulated) achieves a visible transmittance $T_v$ of greater than 0.5 (e.g., greater than 0.6), or greater than 0.7 if the triple silver is replaced with a single silver coating like the present Applicant's commercially available LoE 179 coating. While the desired level of visible transmittance can be selected and varied to accommodate different applications, certain preferred embodiments (e.g., where the coating 7 is one of the exemplary film stacks tabulated herein) provide a coated pane 10' having a monolithic visible transmission of greater than 80%, greater than 82%, or greater than 83% (or even greater than 85% in some cases).

The term "visible transmittance" is well known in the art and is used herein in accordance with its well-known meaning Visible transmittance, as well as visible reflectance, can be determined in accordance with NFRC 300, Standard Test Method for Determining the Solar and Infrared Optical Properties of Glazing Materials and Fading Resistance of Systems (National Fenestration Rating Council Incorporated, adopted December 2001, published January 2002). The well known WINDOW 5.2a computer program can be used in calculating these and other reported optical properties.

The present coating 7 can achieve desirable reflected color properties in combination with excellent thermal insulating properties. In certain embodiments (e.g., where the coating is one of the exemplary film stacks tabulated or detailed below), a monolithic pane coated with the present coating 7 exhibits a reflected film-side color characterized by an a color coordinate of between −2 and −10 (e.g., between −4 and −8, such as −6.16) as well as a b color coordinate of between −1 and −14 (e.g., between −5 and −12, such as −8.83). Further, a monolithic pane coated with the present coating 7 can exhibit a reflected glass-side color characterized by an a color coordinate of between −2 and −10 (e.g., between −4 and −8, such as −6.23) and a b color coordinate of between −1 and −14 (e.g., between −5 and −12, such as −8.95). As just one example, when the coating 7 is 1350 Å indium tin oxide/460 Å silicon nitride, the monolithic reflected film-side color has an a color coordinate of about −6.16 and a b color coordinate of about −8.83, and the monolithic reflected glass-side color has an a color coordinate of about −6.23 and a b color coordinate of about −8.95.

The present pane also exhibits a pleasing transmitted color. Preferably, the coated pane exhibits a monolithic transmitted color characterized by an a color coordinate of between −4 and 8 and a b color coordinate of between about −4 and about 10. In certain preferred embodiments (e.g., where the coating is one of the preferred film stacks tabulated or detailed below), the present pane exhibits a transmitted color characterized by an a color coordinate of between −1 and 5 (such as 1.66) and a b color coordinate of between about 0 and about 7 (such as 3.46).

The present discussion of color properties is reported using the well known color coordinates of "a" and "b." In particular, these color coordinates result from conventional use of the well known Hunter Lab Color System (Hunter methods/units, Ill. D65, 10 degree observer). The present color properties can be determined as specified in ASTM Method E 308, the relevant teachings of which are incorporated herein by reference.

In certain embodiments, the foregoing color properties are provided in combination with the sheet resistance, emissivity, U value, and visible transmission properties reported above. For example, the following chart depicts preferred combinations of properties in accordance with certain embodiments (these tabulated properties are after heat treatment).

|  | preferred | more preferred |
|---|---|---|
| Sheet resistance | less than 20 Ω/square | less than 14 Ω/square |
| emissivity | less than 0.25 | less than 0.18 |
| U value | less than 0.3 | less than 0.22 |
| $T_{vis\ monolithic}$ | greater than 75% | greater than 80% |

The invention also provides several methods for producing the present emission control coating 7. In preferred embodiments, the films are deposited by sputtering. Sputtering is well known in the present art.

Preferably, the emission control coating has a particularly low surface roughness. For example, the coating 7 preferably has a surface roughness $R_a$ of less than 10 nm, less than 5 nm, less than 3 nm, less than 2.5 nm, less than 2.2 nm, or even less than 2.0 nm, such as about 1.9 nm. The deposition method and conditions preferably are chosen so as to provide the coating with such a roughness. Alternatively, the coating could be polished after deposition to reduce its surface roughness. Preferably, though, the coating exhibits the preferred surface roughness without requiring any polishing or the like (e.g., as-deposited).

Surface roughness is defined in terms deviations from the mean surface level. The surface roughness $R_a$ is the arithmetical mean surface roughness. This is the arithmetic average of the absolute deviations from the mean surface level. The arithmetical mean surface roughness of a coating is commonly represented by the equation: $R_a = 1/L \int_0^L |f(x)| dx$." The surface roughness $R_a$ can be measured in conventional fashion, e.g., using an Atomic Force Microscope (AFM) equipped with conventional software that gives $R_a$.

In some embodiments, in addition to the transparent conductive film and the oxygen control film the coating 7 is provided with one or more layers for controlling the color of the coated article. If emissivity is acceptable and accomplished with an expensive target material, then further optical film thickness could be provided by a less costly material.

Further, some embodiments provide a top coat for increasing durability, such as by using a hard overcoat or a layer for "dry" lubrication.

The present invention includes methods of producing a coated substrate, e.g., a coated glass pane. In accordance with the present methods, a substrate 12 having a surface 18 is provided. If desired, this surface 18 can be prepared by suitable washing or chemical preparation. The present coating 7 is deposited on the surface 18 of the substrate 12, e.g., as a series of discrete layers, as a thickness of graded film, or as a combination including at least one discrete layer and at least one thickness of graded film. The coating can be deposited using any thin film deposition technique that is suitable for depositing the desired film materials at the desired low haze and roughness levels. Thus, the present invention includes method embodiments wherein, using any one or more appropriate thin film deposition techniques, the film regions of any embodiment disclosed herein are deposited sequentially upon a substrate (e.g., a sheet of glass or plastic). One preferred method utilizes DC magnetron sputtering, which is commonly used in industry. Reference is made to Chapin's U.S. Pat. No. 4,166,018, the teachings of which are incorporated herein by reference. In preferred embodiments, the present coatings are sputtered by AC or pulsed DC from a pair of cathodes. HiPIMS and other modern sputtering methods can be used as well.

Briefly, magnetron sputtering involves transporting a substrate through a series of low pressure zones (or "chambers" or "bays") in which the various film regions that make up the coating are sequentially applied. To deposit oxide film, the target may be formed of an oxide itself (e.g., indium tin oxide), and the sputtering may proceed in an inert or oxidizing atmosphere. Alternatively, the oxide film can be applied by sputtering one or more metallic targets (e.g., of metallic indium tin sputtering material) in a reactive atmosphere. To deposit indium tin oxide, for example, a ceramic indium tin oxide target can be sputtered in an inert or oxidizing atmosphere. Silicon nitride can be deposited by sputtering one or more silicon targets (which may be doped with aluminum or the like to improve conductivity) in a reactive atmosphere containing nitrogen gas. The thickness of the deposited film can be controlled by varying the speed of the substrate by varying the power on the targets, or by varying the ratio of power to partial pressure of the reactive gas.

Following are a few exemplary methods for coating the present coating 7 onto a glass substrate.

In one method, a pair of rotatable ceramic indium tin oxide targets are sputtered as an uncoated glass substrate is conveyed past the activated targets at a rate of about 36 inches per minute. In this example, the relative weight amounts of the two metals was: indium 90%, tin 10%. Here, a power of 16 kW was used, and the sputtering atmosphere was 5 mTorr with a gas flow of 900 sccm/min argon and 10 sccm/min oxygen. The resulting indium tin oxide film had a thickness of about 1,100 Å. Directly over this ITO film a silicon nitride film was applied. Here, the silicon nitride was applied at a thickness of about 560 Å by conveying the glass sheet at about 36 inches per minute past a pair of rotary silicon aluminum targets (83% Si, 17% Al, by weight) sputtered at a power of 31.2 kW in a 5 mTorr atmosphere with a gas flow 920 sccm/min nitrogen. The coated substrate was then heat treated in air for 15 minutes at a maximum temperature of about 690 degrees C. The following properties were measured before and after heat treatment.

|  | Before Heat Treatment | After Heat Treatment |
| --- | --- | --- |
| $T_{vis}$ | 74.6% | 82.7% |
| $R_{sheet}$ | 60 ohms/square | 16.5 ohms/square |

In another method, rotatable ceramic indium tin oxide targets are sputtered as an uncoated glass substrate is conveyed sequentially past three pairs of such activated targets at a rate of about 75 inches per minute. In this example, the relative weight amounts of the two metals was: indium 90%, tin 10%. Here, a power of 25.8 kW was used for the first pair of rotary targets, a power of 25.5 kW was used for the second pair of rotary targets, and a power of 26.6 kW was used for the third pair of rotary targets. The sputtering atmosphere was 5 mTorr with a gas flow of 900 sccm/min argon and 10 sccm/min oxygen. The resulting indium tin oxide film had a thickness of about 1,250 Å. Directly over this ITO film a silicon nitride film was applied. Here, the silicon nitride was applied at a thickness of about 560 Å by conveying the glass sheet at about 75 inches per minute sequentially past three pairs of rotary silicon aluminum targets (83% Si, 17% Al, by weight) sputtered respectively at powers of 41.7 kW, 42.8 kW, and 41.2 kW in a 5 mTorr atmosphere with a gas flow of 1,520 sccm/min nitrogen. The coated substrate was then heat treated in air for 15 minutes at a maximum temperature of about 690 degrees C. The following properties were measured before and after heat treatment.

|  | Before Heat Treatment | After Heat Treatment |
| --- | --- | --- |
| $T_{vis}$ | 73.9% | 81.5% |
| $R_{sheet}$ | 40.5 ohms/square | 12.5 ohms/square |

In still another method, rotatable ceramic indium tin oxide targets are sputtered as an uncoated glass substrate is conveyed sequentially past three pairs of such activated targets at a rate of about 75 inches per minute. In this example, the relative weight amounts of the two metals was: indium 90%, tin 10%. Here, a power of 5.3 kW was used for the first pair of rotary targets, a power of 25.6 kW was used for the second pair of rotary targets, and a power of 27.8 kW was used for the third pair of rotary targets. The sputtering atmosphere was 5 mTorr with a gas flow of 937 sccm/min argon and 18 sccm/min oxygen. The resulting indium tin oxide film had a thickness of about 1,250 Å. Directly over this ITO film a silicon nitride film was applied. Here, the silicon nitride was applied at a thickness of about 560 Å by conveying the glass sheet at about 75 inches per minute sequentially past three pairs of rotary silicon aluminum targets (83% Si, 17% Al, by weight) sputtered respectively at powers of 41.4 kW, 42.4 kW, and 42.4 kW in a 5 mTorr atmosphere with a gas flow of 1,190 sccm/min nitrogen. The coated substrate was then heat treated in air for 15 minutes at a maximum temperature of about 690 degrees C. The following properties were measured before and after heat treatment.

|  | Before Heat Treatment | After Heat Treatment |
| --- | --- | --- |
| $T_{vis}$ | 74.9% | 82.3% |
| $R_{sheet}$ | 42.7 ohms/square | 13 ohms/square |

In yet another method, a pair of rotatable metallic indium tin targets are sputtered as an uncoated glass substrate is conveyed past the activated targets at a rate of about 60 inches per minute. In this example, the relative weight amounts of the two metals was: indium 90%, tin 10%. Here, a power of 16 kW was used for the pair of rotary targets. The sputtering atmosphere was 5 mTorr with a gas flow of 601 sccm/min argon and 100 sccm/min oxygen. The resulting indium tin oxide film had a thickness of about 1,240 Å. Directly over this ITO film a silicon nitride film was applied. Here, the silicon nitride was applied at a thickness of about 560 Å by conveying the glass sheet at about 60 inches per minute sequentially past a pair of rotary silicon aluminum targets (83% Si, 17% Al, by weight) sputtered at 31.2 kW in a 5 mTorr atmosphere with a gas flow of 900 sccm/min nitrogen. The coated substrate was then heat treated in air for 15 minutes at a maximum temperature of about 690 degrees C. The following properties were measured before and after heat treatment.

|  | Before Heat Treatment | After Heat Treatment |
| --- | --- | --- |
| $T_{vis}$ | 74% | 85.7% |
| $R_{sheet}$ | 74.4 ohms/square | 18.51 ohms/square |

In a further method, a pair of rotatable metallic indium tin targets are sputtered as an uncoated glass substrate is conveyed past the activated targets at a rate of about 60 inches per minute. In this example, the relative weight amounts of the two metals was: indium 90%, tin 10%. Here, a power of 16 kW was used for the pair of rotary targets. The sputtering atmosphere was 5 mTorr with a gas flow of 601 sccm/min argon and 100 sccm/min oxygen. The resulting indium tin oxide film had a thickness of about 1,240 Å. Directly over this ITO film a silicon nitride film was applied. Here, the silicon nitride was applied at a thickness of about 600 Å by conveying the glass sheet at about 60 inches per minute sequentially past a pair of rotary silicon aluminum targets (83% Si, 17% Al, by weight) sputtered at 38.6 kW in a 5 mTorr atmosphere with a gas flow 450 sccm/min argon and 451 sccm/min nitrogen. The coated substrate was then heat treated in air for 15 minutes at a maximum temperature of about 690 degrees C. The following properties were measured before and after heat treatment.

|  | Before Heat Treatment | After Heat Treatment |
| --- | --- | --- |
| $T_{vis}$ | 74.7% | 82.8% |
| $R_{sheet}$ | 63.4 ohms/square | 14.5 ohms/square |

For the samples above, the surface roughness of the coated glass is about 1.9 nm and the haze is about 0.08.

The examples above represent embodiments wherein the coated substrate exhibits a $\Delta T_{vis}$ due to heat treatment (optionally at temperatures leaving the heat-treated glass in a state of stress that allows the glass to be cut readily by conventional glass cutting) of at least +5%, preferably at least +7%, and in some cases at least +8%. Additionally or alternatively, these embodiments can exhibit a $R_{sheet}$ decrease of 20 ohms/square or more, 30 ohms/square or more in some cases, 40 ohms/square or more in some cases, or even 50 ohms/square or more in some cases. As with the examples shown above, this can be in combination with a post-heat monolithic $T_{vis}$ of greater than 80%, a post-heat $R_{sheet}$ of less than 20 ohms/square, or both.

The heat treatment used in the foregoing examples involved a lab furnace that is set to match the results out of a production tempering line but that allows the use of smaller samples. The lab furnace specifications are as follow:
Total length of furnace=2160 mm
Load and unload end are 600 mm each
Zones=6 (each zone is 360 mm in length)
Belt speed=300 mm/min
Temp
Zone 1=540 C
Zone 2=690 C
Zone 3=655 C
Zone 4=610 C
Zone 5=570 C
Zone 6=520 C It will be understood that these details are by no means limiting to the invention. For example, the coated substrate can alternatively be heat treated on a conventional production tempering line. In tempering, glass is placed in a furnace maintained at about 680-705° C. (preferably controlled to 690-700° C.). The glass is typically held in the furnace for 100-120 seconds with constant movement to better ensure temperature uniformity of the product. This is intended to raise the glass temperature to about 640° C. The glass is then removed from the furnace and placed in a stream of air for about 50 seconds such that the glass is cool enough for an operator to handle. Moreover, as already explained, the substrate can alternatively be heated prior to film deposition, during deposition, or both.

While some preferred embodiments of the invention have been described, it should be understood that various changes, adaptations and modifications may be made therein without departing from the spirit of the invention and the scope of the appended claims.

What is claimed is:

1. A multiple-pane insulating glazing unit comprising an exterior pane having opposed first and second major surfaces, the multiple-pane insulating glazing unit further including an interior pane, the multiple-pane insulating glazing unit having at least one between-pane space, the exterior pane having an internal surface bearing a low-emissivity coating, the low-emissivity coating being exposed to a between-pane space of the multiple-pane insulating glazing unit, the interior pane having an external surface bearing an emission control coating comprising a transparent conductive film comprising indium tin oxide and having a thickness of between 1,100 angstroms and 1,500 angstroms over which there is an oxygen barrier film comprising silicon nitride or silicon oxynitride and having a thickness of between 400 angstroms and 750 angstroms, wherein the oxygen barrier film comprising silicon nitride or silicon oxynitride is exposed and configured to be positioned to face an environment inside a building, the emission control coating having a sheet resistance of less than 20 ohms/square, an emissivity of less than 0.25, a haze of less than 0.3, and a roughness $R_a$ of less than 3 nm, said coated interior pane having a monolithic visible transmission of greater than 75%, the multiple-pane insulating glazing unit having a U value of less than 0.3.

2. The multiple-pane insulating glazing unit of claim 1 wherein the oxygen barrier film comprises silicon nitride.

3. The multiple-pane insulating glazing unit of claim 1 wherein the surface roughness $R_a$ of the emission control coating is less than 2 nm.

4. The multiple-pane insulating glazing unit of claim 1 wherein the emission control coating is a heat treated coating and the haze is less than 0.2.

5. The multiple-pane insulating glazing unit of claim 1 wherein the monolithic visible transmission of said coated interior pane is greater than 80%.

6. The multiple-pane insulating glazing unit of claim 1 wherein the monolithic visible transmission of said coated interior pane is greater than 83%.

7. The multiple-pane insulating glazing unit of claim 1 wherein the U value is less than 0.22.

8. The multiple-pane insulating glazing unit of claim 1 wherein the low-emissivity coating is a single-silver low-emissivity coating having only one film comprising silver, and the multiple-pane insulating glazing unit has a visible transmittance $T_v$ of greater than 0.7.

9. The multiple-pane insulating glazing unit of claim 1 wherein the sheet resistance of the emission control coating is less than 13 ohms/square.

10. A multiple-pane insulating glazing unit including an outboard pane and an inboard pane, the insulating glazing unit having at least one between-pane space, the insulating glazing unit having an internal surface bearing a low-emissivity coating that includes at least one film comprising silver and that is exposed to said between-pane space, the inboard pane having a room-side external surface bearing an emission control coating comprising a transparent conductive film comprising indium tin oxide and having a thickness of between 1,100 angstroms and 1,500 angstroms over which there is an oxygen barrier film comprising silicon nitride or silicon oxynitride and having a thickness of between 400 angstroms and 750 angstroms, wherein the oxygen barrier film comprising silicon nitride or silicon oxynitride is exposed and configured to be positioned to face a room-side environment inside a building, the emission control coating being a heat treated coating having a sheet resistance of less than 20 ohms/square, an emissivity of less than 0.25, a haze of less than 0.3, and a roughness $R_a$ of less than 3 nm, said coated interior pane having a monolithic visible transmission of greater than 80% and being characterized by a $\Delta T_{vis}$ due to heat treatment of at least +5% and a $R_{sheet}$ decrease of 20 ohms/square or more, the multiple-pane insulating glazing unit having a U value of less than 0.3 and a visible transmittance $T_v$ of greater than 0.6.

11. The multiple-pane insulating glazing unit of claim 10 wherein the surface roughness $R_a$ of the emission control coating is less than 2 nm.

12. The multiple-pane insulating glazing unit of claim 10 where the oxygen barrier film comprises silicon nitride.

13. The multiple-pane insulating glazing unit of claim 10 wherein the insulating glazing unit is part of a window assembly comprising a frame member securing the insulating glazing unit in a position in which the outboard pane has an external surface exposed to periodic contact with rain and the room-side external surface of the inboard pane is exposed to an environment inside a home or another building.

14. The multiple-pane insulating glazing unit of claim 1 wherein the panes of the multiple-pane insulating glazing unit are glass.

15. The multiple-pane insulating glazing unit of claim 10 wherein the panes of the multiple-pane insulating glazing unit are glass.

16. The multiple-pane insulating glazing unit of claim 1 wherein the low-emissivity coating includes a layer comprising silver.

17. The multiple-pane insulating glazing unit of claim 1 wherein all the films of the emission control coating are sputtered films.

18. The multiple-pane insulating glazing unit of claim 10 wherein all the films of the emission control coating are sputtered films.

\* \* \* \* \*